(12) United States Patent
Kanoh et al.

(10) Patent No.: US 6,743,479 B2
(45) Date of Patent: Jun. 1, 2004

(54) ELECTROLESS COPPER PLATING SOLUTION AND HIGH-FREQUENCY ELECTRONIC COMPONENT

(75) Inventors: Osamu Kanoh, Omihachiman (JP); Kenji Yoshida, Shiga-ken (JP)

(73) Assignee: Murata Manufacturing Co. Ltd. (JP)

( * ) Notice: Subject to any disclaimer, the term of this patent is extended or adjusted under 35 U.S.C. 154(b) by 18 days.

(21) Appl. No.: 10/120,510

(22) Filed: Apr. 12, 2002

(65) Prior Publication Data

US 2002/0192364 A1 Dec. 19, 2002

(30) Foreign Application Priority Data

Apr. 24, 2001 (JP) ........................................ 2001-125260
Feb. 14, 2002 (JP) ........................................ 2002-036242

(51) Int. Cl.[7] .............................................. B05D 1/18
(52) U.S. Cl. ................. 427/305; 427/383.1; 427/383.3; 427/383.5; 427/433.1; 427/433.2
(58) Field of Search .................. 428/209, 469; 106/1.22, 1.23, 1.24, 1.27; 205/126, 80, 123, 125, 158, 162, 163, 238, 239; 427/443.1, 383.1, 383.3, 383.5, 433.2, 304, 305

(56) References Cited

U.S. PATENT DOCUMENTS

| | | | | |
|---|---|---|---|---|
| 3,615,732 A | * | 10/1971 | Shipley et al. | 106/1.23 |
| 3,615,733 A | * | 10/1971 | Shipley et al. | 106/1.23 |
| 3,649,350 A | * | 3/1972 | Agens | 427/98 |
| 3,765,936 A | * | 10/1973 | Shipley et al. | 174/256 |
| 4,482,596 A | * | 11/1984 | Gulla et al. | 428/131 |
| 4,964,923 A | * | 10/1990 | Takeuchi et al. | 148/276 |
| 5,897,692 A | * | 4/1999 | Kotsuka et al. | 106/1.23 |
| 6,534,117 B1 | * | 3/2003 | Yoshio et al. | 427/98 |

FOREIGN PATENT DOCUMENTS

| | | | | |
|---|---|---|---|---|
| JP | 49065537 | * | 6/1974 | |
| RO | 72375 A | * | 9/1980 | |
| RU | 1138433 A | * | 2/1985 | |
| RU | 2069457 C1 | * | 11/1996 | |
| SU | 497359 A | * | 3/1976 | |

* cited by examiner

Primary Examiner—Stephen Stein
(74) Attorney, Agent, or Firm—Dickstein, Shapiro, Morin & Oshinsky, LLP

(57) ABSTRACT

An electroless copper plating solution which can ensure superior adhesion of a copper plating film to a flat ceramic surface having low roughness and which can form a high-frequency electronic component having superior high-frequency conductivity and a high Q value is provided. Also provided is a high frequency electronic component formed by using this electroless copper plating solution. The electroless copper plating solution of contains copper ions, nickel ions, formaldehyde or a derivative thereof, and tartaric acid or a salt thereof. The ratio of the content of the nickel ions to that of the copper ions on a molar basis is in the range of about 0.0001 to 0.015.

17 Claims, 2 Drawing Sheets

ELECTROLESS COPPER PLATING SOLUTION AND HIGH-FREQUENCY ELECTRONIC COMPONENT

BACKGROUND OF THE INVENTION

1. Field of the Invention

The present invention relates to an electroless copper plating solution and to a high-frequency electronic component having a copper plating film formed by using the electroless copper plating solution.

2. Description of the Related Art

When copper plating films used as high-frequency conductors are formed, an alkaline electroless copper plating solution, which is an aqueous solution containing copper ions, formaldehyde used as a reducing agent, and ethylenediamine tetraacetic acid (EDTA) used as a complexing agent, has generally been used. In addition, a copper plating film approximately 2 to 4 μm thick formed by using an electroless copper plating solution has been used as an electrode in high-frequency electronic components, such as a dielectric coaxial resonator used in the region of 800 to 2,000 MHz or a millimeter wave resonator used in the region of 20 to 30 GHz.

In this connection, the superior conductivity of copper plating films has been important in high-frequency electronic components, for example, dielectric resonators, and in addition, it has also been important that copper plating films do not develop blisters and have superior adhesion to ceramics. In addition, when a conventional electroless copper plating solution containing EDTA is used, the surfaces of a ceramic substrate are strongly etched beforehand using an etching agent containing hydrogen fluoride so as to ensure the adhesion of the copper plating film by fully exploiting the anchor effect obtained by roughening ceramic surfaces.

However, when the roughness of the ceramic surface is increased by strong etching, the high-frequency conductivity is decreased, and in addition to a decrease in the Q value (resonance sharpness), the so-called Qc value, of the copper plating film itself used as an electrode, the Q value of a dielectric resonator, that is, the so-called Qo value, is also decreased. In order to avoid these inconveniences, it has been considered that even when a conventional electroless copper plating solution containing EDTA is used, the etching should be mildly performed so that the roughness of the ceramic surface is decreased.

However, when the roughness of a ceramic surface is decreased and plating is then performed, blisters are developed on the copper plating film, and hence, superior adhesion of the copper plating film to the ceramic substrate cannot be reliably obtained. It has been believed that the reason this phenomenon occurs is that since hydrogen is violently generated due to the decomposition of formaldehyde, which is used as a reducing agent, contained in the electroless copper plating solution, the anchor effect is decreased by the generated hydrogen which interferes with the deposition of copper on the ceramic substrate having low surfaces roughness.

SUMMARY OF THE INVENTION

In consideration of the problems described above, the present invention was made, and an object of the present invention is to provide an electroless copper plating solution which can form a copper plating film having superior high-frequency conductivity and superior adhesion to a smooth ceramic surface having low roughness. In addition, the present invention also provides a high-frequency electronic component having a high Qo value formed by using this electroless copper plating solution.

In accordance with one aspect of the present invention, there is provided an electroless copper plating solution comprising copper ions; nickel ions; formaldehyde or a derivative thereof; and tartaric acid or a salt thereof. In addition, the ratio of the content of the nickel ions to that of the copper ions on a molar basis in the electroless copper plating solution is preferably in the range of about 0.0001 to 0.015 and more preferably about 0.0001 to 0.01.

When an electroless copper plating solution contains tartaric acid or a salt thereof as a complexing agent and does not contain nickel, plating stops before precipitation of copper sufficiently proceeds, and as a result, it has not been possible to form a copper plating film having a thickness of about 2 μm or more in practice. However, with the electroless copper plating solution of the present invention, which contains nickel, the nickel functions as a catalyst for precipitation to allow the copper to continuously precipitate, and hence, the thick copper film generally used for high-frequency conductors can be easily formed.

In addition, when the electroless copper plating solution of the present invention is used in the case in which plating is performed on a ceramic substrate having low surface roughness, the amount of hydrogen generated by decomposition of formaldehyde caused by the effect of the added nickel together with tartaric acid functioning as a complexing agent is decreased. Accordingly, the copper easily precipitates on the low surface roughness ceramic surface and blisters are not developed in the copper plating film, whereby superior adhesion of the copper plating film to the ceramic substrate can be reliably obtained. In addition, since the content of the nickel is small, conductivity equivalent to that of pure copper can be obtained. Furthermore, the nickel added in a small amount also serves to improve the adhesion of the copper plating film to the ceramic substrate in combination with oxygen.

In accordance with another aspect of the present invention, there is provided a high-frequency electronic component comprising a copper plating film formed by plating using the electroless copper plating solution described above. In addition, there is provided a high-frequency electronic component in accordance with another aspect of the present invention, comprising a dielectric ceramic and a metal film formed on a surface of the dielectric ceramic, wherein the metal film is primarily composed of copper containing at least nickel, and the ratio of the content of the nickel to that of the copper on a molar basis is in the range of about 0.0001 to 0.015.

A high-frequency electronic component, such as a dielectric resonator, formed as described above has a copper plating film which is preferably used as a high-frequency conductor, that is, an electrode having a thick copper plating film. Accordingly, superior high-frequency conductivity and a high Qo value can be advantageously obtained.

DESCRIPTION OF EXAMPLES

Hereinafter, examples of the present invention will be described with reference to figures.

First Example

Figure 1:
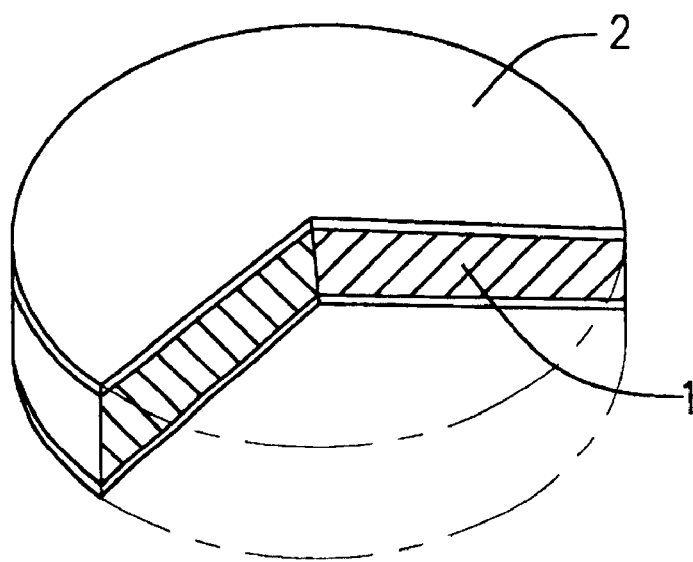
FIG. 1 is a partially cutaway perspective view of a dielectric resonator according to a first example.

An electroless copper plating solution of this first example comprises copper ions, nickel ions, formaldehyde or a derivative thereof, and tartaric acid or a salt thereof. FIG. 1 is a partially cutaway perspective view of a dielectric resonator, and this dielectric resonator has a copper plating film used as an electrode formed by plating using the electroless copper plating solution of this first example. Hereinafter, the steps of manufacturing a dielectric resonator formed by using an electroless copper plating solution will be described, and the electroless copper plating solution of the first example and the dielectric resonator formed by using the above plating solution will also be described. That is, the dielectric resonator will be described as an example of a high-frequency electronic component.

As a step of manufacturing the dielectric resonator of the first example, disc-shaped ceramic units 1 formed of a mixed ceramic containing $BaTi_4O_9 \cdot Ba_2Ti_9O_{20}$ and $BaSm_2Ti_4O_{12}$ were first prepared. This ceramic units 1 had an outside diameter of 27 mm. The ceramic units 1 were processed by lapping so as to decrease the thickness to approximately 5 mm and so as to have different surface roughness obtained by treatment using emery paper #1,000, #2,000 and #4,000, as well as mirror surface. The ceramic units 1 thus polished were washed by using alkaline surfactant solution and, after neutralization was performed, were then immersed in a solution containing an alkaline palladium ion as a catalyst for reduction, whereby the ceramic units 1 were activated.

Separately, an electroless copper plating solution containing copper ions, nickel ions, formaldehyde or a derivative thereof (for example, paraformaldehyde or glyoxylic acid), and tartaric acid or a salt thereof was prepared. As shown in Table 1, an electroless copper plating solution containing a water soluble copper salt (copper sulfate: $CuSO_4 \cdot 5H_2O$); a water soluble nickel salt (nickel sulfate: $NiSO_4 \cdot 6H_2O$); a salt of tartaric acid which is a complexing agent, for example, potassium sodium tartrate tetrahydrate (Rochelle salt: $KNaC_4H_4O_6 \cdot 4H_2O$); and formaldehyde (HCHO) which is a reducing agent, was prepared. The contents of the individual components in 1 liter are shown in Table 1, and the pH of this electroless copper plating solution was set to 12.7 by using NaOH. In addition, polyethylene glycol was added to this electroless copper plating solution as a surfactant.

TABLE 1

| | $CuSO_4 \cdot 5H_2O$ | $NiSO_4 \cdot 6H_2O$ | $KNaC_4H_4O_6 \cdot 4H_2O$ | HCHO |
|---|---|---|---|---|
| Moles/Liter | 0.04 | 0.00008 | 0.1 | 0.12 |

Subsequently, the individual ceramic units 1 were immersed in this electroless copper plating solution having the composition shown in Table 1 and were processed by plating for a predetermined time at 36° C. while air was fed into this electroless copper plating solution. Over the entire surface of each ceramic unit 1, an electroless copper plating film 2 was formed, as shown in FIG. 1, and according to measurement by using an x-ray fluorescence thickness meter, the thickness of the electroless copper plating film 2 was approximately 3.5 μm. In this step, no blisters were developed in each copper plating film 2 formed on the ceramic unit 1.

In addition, a conventional electroless copper plating solution containing EDTA as a complexing agent was prepared as a comparative example in order to compare with the electroless copper plating solution described in this first example. As shown in Table 2, an electroless copper plating solution containing copper sulfate, EDTA, and formaldehyde (HCHO) at the concentrations shown in Table 2 and having a pH of 13 controlled by NaOH was prepared. In addition, polyethylene glycol was also added to this electroless copper plating solution as a surfactant.

TABLE 2

| | $CuSO_4 \cdot 5H_2O$ | EDTA | HCHO |
|---|---|---|---|
| Moles/Liter | 0.03 | 0.06 | 0.09 |

Subsequently, the individual ceramic units 1 were immersed in this electroless copper plating solution having the composition shown in Table 2 and were processed by plating for a predetermined time at 37° C. while air was fed into this electroless copper plating solution until a copper plating film having a thickness of approximately 3.5 μm was formed. When plating was performed by using the electroless copper plating solution of the comparative example, the plating film was easily peeled away from the ceramic unit 1 during plating when the ceramic unit 1 had a mirror surface, and as a result, the copper plating film 2 was not formed. When the ceramic unit 1 had a surface roughness obtained by treatment using emery paper #2,000 or #4,000, blisters were developed in the copper plating film 2, and hence, superior adhesion was not obtained.

The individual ceramic units 1 provided with the copper plating films 2 thus formed were processed by a heat treatment in a nitrogen atmosphere at 650° C. for 1 hour, and the peripheries of the individual ceramic units 1 were then processed by centerless polishing, thereby forming disc-shaped TM mode dielectric resonators. Next, the Qo value of each dielectric resonator thus formed was measured, and the results are shown in Table 3. In addition, after the copper plating film 2 formed on the individual surfaces of each ceramic unit 1 was removed by etching using sodium persulfate solution, the surface roughness of the ceramic unit 1 was measured using stylus surface roughness measuring equipment (DEKTAK 3ST), and the results are shown in Table 4.

TABLE 3

Qo Value (26 mm in diameter, a resonant frequency of 2 GHz)

| Polishing Condition | #1,000 | #2,000 |
|---|---|---|
| Example 1 | 2,342 | 2,406 |
| Comparative Example | 2,120 | 2,253 |
| Polishing Condition | #4,000 | Mirror Surface |
| Example 1 | 2,515 | 2,656 |
| Comparative Example | 2,315 | Not Formed |

TABLE 4

Roughness (Unit: μm)

| | | Polishing Condition | #1,000 | #2,000 |
|---|---|---|---|---|
| Example 1 | | Front Surface | 0.317 | 0.123 |
| | | Rear Surface | 0.342 | 0.125 |
| Comparative | | Front Surface | 0.330 | 0.128 |
| Example | | Rear Surface | 0.325 | 0.121 |
| | | Polishing Condition | #4,000 | Mirror Surface |
| Example 1 | | Front Surface | 0.092 | 0.009 |
| | | Rear Surface | 0.082 | 0.007 |
| Comparative | | Front Surface | 0.085 | 0.007 |
| Example | | Rear Surface | 0.088 | 0.008 |

The measurement results shown in Table 3 indicate that when the electroless copper plating solution of the first example, that is, the electroless copper plating solution containing a tartaric acid as a complexing agent and a small amount of nickel, is used, it was found that a dielectric resonator having a high Qo value could be obtained. In addition, the measurement results shown in Table 4 indicate that even when the surface of the ceramic unit 1 had a mirror surface, no blisters were developed in the copper plating film 2.

Second Example

Figure 2:
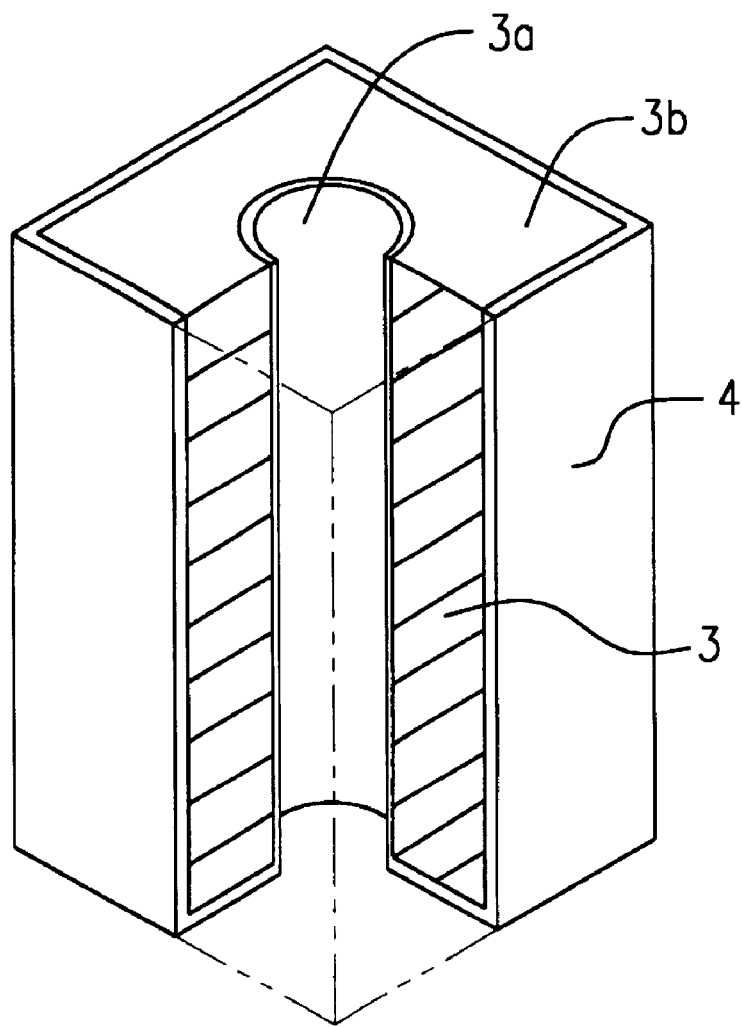
FIG. 2 is a partially cutaway perspective view of a dielectric resonator according to a second example.

An electroless copper plating solution according to a second example contained copper ions, nickel ions, formaldehyde or a derivative thereof, and tartaric acid or a salt thereof, and the ratio of the content of the nickel ions to that of the copper ions on a molar basis is in the range of about 0.0001 to 0.01. FIG. 2 is a partly cutaway perspective view of a dielectric resonator, and this dielectric resonator has a copper plating film formed by using the electroless copper plating solution in the second example. Hereinafter, the steps of manufacturing a dielectric resonator by using an electroless copper plating solution will be described, and the electroless copper plating solution of the second example and the dielectric resonator having electrodes formed by using this electroless copper plating solution will also be described with reference to the manufacturing steps.

In order to manufacture the dielectric resonator of this second example, a plurality of ceramic units 3, which were each composed of a mixed ceramic of $BaTi_4O_9 \cdot Ba_2Ti_9O_{20}$ and $BaSm_2Ti_4O_{12}$ in a rectangular parallelepiped form 3 mm long, 3 mm wide and 5 mm high and which were each provided with a throughhole 3a having a diameter of 1 mm at the center of a surface perpendicular to the longitudinal direction in the figure, was first prepared. Next, an etching solution of an aqueous HF solution at a concentration of 0.25 moles per liter was prepared, and the individual ceramic units 3 were immersed in this etching solution at 70° C. for 10 minutes, thereby etching the surfaces of the individual ceramic units 3. In addition, the ceramic units 3 were washed by using an alkaline surfactant solution and, after neutralization was performed, were then immersed in a solution containing an alkaline palladium ion catalyst for reduction, whereby the ceramic units 3 were activated.

Separately from forming the ceramic units 3, a plurality of electroless copper plating solutions, which contained copper ions, nickel ions, formaldehyde or a derivative thereof, and tartaric acid or a salt thereof and which had different molar ratios of the nickel ions to the copper ions from each other, that is, different nickel concentrations, was prepared. Each electroless copper plating solution contained copper sulfate, nickel sulfate, potassium sodium tartrate tetrahydrate functioning as a complexing agent, and formaldehyde functioning as a reducing agent, and the pH thereof was controlled by NaOH as in the case of the electroless copper plating solution shown in Table 1. However, as shown in Table 5, the added amounts of the nickel sulfate in the individual electroless copper plating solutions, that is, the added amounts of the nickel ions to 100 moles of the copper ions, were from 0.01 to 1.5 moles, that is, the electroless copper plating solutions of this example had different nickel contents from each other. Polyethylene glycol was also added to this electroless copper plating solution as a surfactant.

TABLE 5

| Qo Value (a resonant frequency of 2 GHz) | | | | |
|---|---|---|---|---|
| Added Amount of Ni (moles) | 0.00 | 0.01 | 0.05 | 0.10 |
| Qo Value | 392 | 432 | 475 | 483 |
| Added Amount of Ni (moles) | 0.20 | 0.50 | 1.00 | 1.50 |
| Qo Value | 495 | 464 | 435 | 415 |

Next, the ceramic units 3 were placed in barrels, and each barrel was immersed in one of the electroless copper plating solutions. Subsequently, plating was performed at a revolving speed of the barrel of 1 revolution per minute (rpm) at a temperature of 36° C. while air was fed in the electroless copper plating solution until a copper plating film 4 having a thickness of approximately 3 μm was formed on the surface of each ceramic unit 3. The amount of the air thus fed in this step was set to 0.1 to 0.5 liters per minute so that the added amounts of the nickel ions to 100 moles of the copper ions is in the range of 0.01 to 1.5 moles.

The reason the amount of the air fed in the plating solution is controlled is that when the amount of the air is 0.1 liters per minute or less, even when the added amount of the nickel ions to 100 moles of the copper ions is in the range of 0.01 to 1.5 moles, the precipitation speed of the copper is increased, the particles obtained by precipitation become coarse and large, and as a result, the high-frequency conductivity is decreased. When the amount of the air is 0.5 liters per minute or more, the stress of the copper plating film 4 is increased, and hence, blisters are easily developed. Accordingly, the amount of the air fed in the plating solution is preferably in the range of about 0.2 to 0.4 liters per minute.

By performing the plating described above, the electroless copper plating film 4 could be formed over the entire surface of each ceramic unit 3. After each ceramic unit 3 provided with the copper plating film 4 was processed by a heat treatment at 650° C. for 1 hour in a nitrogen atmosphere, the copper plating film 4 formed on one end surface of the ceramic unit 3 perpendicular to the longitudinal direction in the figure was removed by polishing so as to form an exposed surface 3b, thereby forming a TEM mode dielectric resonator having the structure shown in FIG. 2. Furthermore, the Qo value of each dielectric resonator thus formed was measured, and the measurement results thereof are shown in Table 5.

As can be seen from the results shown in Table 5, it was found that when the added amount of the nickel ions to 100 moles of the copper ions is in the range of about 0.01 to 1 moles, the Qo value of the dielectric resonator was increased. That is, in this example, a copper plating film 4 primarily composed of copper containing the nickel was formed as a metal film on the surface of the ceramic unit 3 formed of the dielectric ceramic, and this copper plating film 4 was a metal film in which the ratio of the content of the nickel to that of the copper on a molar basis is in the range of about 0.0001 to 0.015.

When an electroless copper plating solution in which the added amount of the nickel ions to 100 moles of the copper ions was less than about 0.015 moles was used, the thickness necessary for forming the film could not be obtained, and blisters were developed in the copper plating film 4. When the added amount of the nickel ions to 100 moles of the copper ions was more than 1 mole, it was found that the high-frequency conductivity was decreased and that, since the copper plating film 4 formed on the corner of the dielectric resonator had a defect due to degraded flexibility of the copper plating film 4, the Qo value was also decreased.

Next, the relationship between the surface roughness of the ceramic substrate forming the dielectric resonator and the copper plating film 4 will be described. First, an electroless copper plating solution having the same composition as that shown in Table 1, that is, an electroless copper plating solution which contained copper ions, nickel ions, tartaric acid, and formaldehyde, and which contained 0.2 moles of the nickel ions with respect to 100 moles of the copper ions, was prepared.

Etching was performed by dipping the ceramic units 3 in an aqueous solution containing HF at a concentration of 0.25 moles per liter at 70° C. for 5, 10, 15, 20, 25 or 30 minutes. Next, the ceramic units 3 processed by etching for different times from each other were placed in different barrels, and the barrels were immersed in the electroless copper plating solution described above. Subsequently, plating was performed at a revolving speed of the barrel of 1 rpm at a temperature of 36° C. while air was fed in the electroless copper plating solution until a copper plating film 4 having a thickness of approximately 3 µm was formed on the surface of each ceramic unit 3.

In addition, an electroless copper plating solution which contained EDTA functioning as a complexing agent, that is, an electroless copper plating solution having the same composition as that shown in Table 2, was prepared as a comparative example. The ceramic units 3 were placed in the barrel, and the barrel was then immersed in this electroless copper plating solution. Subsequently, plating was performed at a temperature of 37° C. while air was fed in the electroless copper plating solution until a copper plating film 4 having a thickness of approximately 3 µm was formed on the surface of each ceramic unit 3.

Subsequently, the individual ceramic units 3 provided with the copper plating films 4 thus formed were processed by a heat treatment in a nitrogen atmosphere at 650° C. so as to form the dielectric resonators, and the Qo value of each dielectric resonator thus formed was measured. The results are shown in Table 6. In addition, the state of blister development and the size of blisters in the copper plating films 4 formed on the surface of each ceramic unit 3 was studied, and the results are shown in Table 7.

TABLE 6

Qo Value (a resonance frequency of 2 GHz)

| Etching Time (minutes) | 5 | 10 | 15 |
|---|---|---|---|
| Example 2 | 474 | 485 | 496 |
| Comparative Example | | 423 | 437 |
| Etching Time (minutes) | 20 | 25 | 30 |
| Example 2 | 472 | 453 | 436 |
| Comparative Example | 431 | 428 | 410 |

TABLE 7

State of Blister Development and the Size of Blister

| Etching Time (minutes) | 5 | 10 | 15 |
|---|---|---|---|
| Example 2 | NONE | NONE | NONE |
| Comparative Example | Peeling of Plating Film | Approximately 300 µm | Approximately 100 µm |
| Etching Time (minutes) | 20 | 25 | 30 |
| Example 2 | NONE | NONE | NONE |
| Comparative Example | Approximately 50 µm | Approximately 20 µm | Approximately 20 µm |

According to the results shown in Tables 6 and 7, the copper plating film 4 was not formed in some cases when a conventional type electroless copper plating solution was used, and in addition, large blisters were developed. In contrast, when an electroless copper plating solution which contained tartaric acid functioning as a complexing agent and a small amount of nickel was used, it was found that even when the surface of the ceramic unit 3 was not strongly etched due to short etching time, the copper plating film 4 was not peeled away and blisters were not developed therein. In addition, it was also found that a dielectric resonator having a high Qo value could be obtained.

Subsequently, the adhesion strength of the copper plating film 4 was measured. In this measurement, a tool used for tensile strength measurement, which was composed of a metal block having a square bottom surface 1.5 mm wide and 1.5 mm long and a wire ring connected thereto, was prepared. After the tool described above was soldered to the copper plating film 4 functioning as an electrode of the dielectric resonator, this tool was pulled in the direction perpendicular to the copper plating film 4, and the tensile strength (N) at which the copper plating film 4 was peeled away from the surface of the ceramic unit 3 was determined. The measurement results are shown in Table 8.

TABLE 8

Adhesion Strength

| Etching Time (minutes) | 5 | 10 | 15 |
|---|---|---|---|
| Example 2 | 75 | 78 | 86 |
| Comparative Example | | 15 | 32 |
| Etching Time (minutes) | 20 | 25 | 30 |
| Example 2 | 94 | 90 | 93 |
| Comparative Example | 43 | 44 | 41 |

According to the results shown in Table 8, when the electroless copper plating solution of this example, that is, an electroless copper plating solution which contained tartaric acid functioning as a complexing agent and a small amount of nickel, was used, it was found that even when the etching time was short, high adhesion strengths could be obtained compared to the case in which a conventional electroless copper plating solution was used. In addition, when it is necessary, an additional electroless copper plating film may be further formed on the dielectric resonator provided with an electroless copper plating film in some cases.

The high-frequency electronic component of the present invention is not limited to dielectric resonators, and in addition to the dielectric resonators, the present invention can be naturally applied to the other high-frequency electronic components. In the examples of the present invention, the dielectric resonator was described as a high-frequency electronic component; however, the high-frequency electronic component of the present invention is not limited to the dielectric resonator by the description in the examples. For example, the high-frequency electronic component of the present invention may be a filter or a duplexer formed using the dielectric resonator, and in addition, the present invention may be applied to high-frequency electronic components other than dielectric resonators.

As has thus been described, the electroless copper plating solution of the present invention contains copper ions, nickel ions, formaldehyde or a derivative thereof, and tartaric acid or a salt thereof In addition, this electroless copper plating solution is prepared so that the ratio of the content of the nickel ions to that of the copper ions on a molar basis is in the range of about 0.0001 to 0.015. The amounts of the components other than Ni are conventional. Since the amount of hydrogen generated during plating is small, a thick copper plating film can be easily formed on a flat ceramic surface, and blisters are not developed in the copper plating film, whereby superior adhesion of the copper plating film to the ceramic substrate can be advantageously obtained.

The high-frequency electronic component of the present invention comprises a copper plating film formed by plating using an electroless copper plating solution. That is, the high-frequency electronic component of the present invention comprises a dielectric ceramic and a metal film formed on the surface of this dielectric ceramic, and this metal film primarily comprises copper containing at least nickel, in which the ratio of the content of the nickel to that of the copper on a molar basis is in the range of about 0.0001 to 0.015. Since the electroless copper plating solution of the present invention is used, the high-frequency dielectric component of the present invention has an electrode composed of a thick copper plating film having superior adhesion which can be suitably used as a high-frequency conductor. Accordingly, the advantages in that the high-frequency conductivity and the Qo value of this high-frequency electronic component are increased can be reliably obtained.

What is claimed is:

1. A method of forming a copper plated film on to a ceramic substrate comprising plating a copper plating film on a dielectric ceramic substrate comprising barium and titanium from an electroless copper plating solution comprising:

copper salt;

nickel salt;

formaldehyde or a derivative thereof; and tartaric acid or a salt thereof and then heat treating the plated film.

2. The method of forming a copper plated film on a ceramic substrate according to claim 1, wherein the ratio of the content of the nickel ions to that of the copper ions on a molar basis in the electroless copper plating solution is in the range of about 0.0001 to 0.015.

3. The method of forming a copper plated film on a ceramic substrate according to claim 2, wherein the ratio of the content of the nickel ions to that of the copper ions on a molar basis in the electroless copper plating solution is in the range of about 0.0001 to 0.01.

4. The method of forming a copper plated film on a ceramic substrate according to claim 3, wherein the ratio of the content of the nickel ions to that of the copper ions on a molar basis in the electroless copper plating solution is in the range of about 0.0005 to 0.05.

5. The method of forming a copper plated film on a ceramic substrate according to claim 4, wherein the nickel and copper salts are sulfates.

6. The method of forming a copper plated film on a ceramic substrate according to claim 5, wherein the tartaric acid or a salt thereof is Rochelle salt.

7. The method of forming a copper plated film on a ceramic substrate according to claim 2, wherein the nickel and copper salts are sulfates.

8. The method of forming a copper plated film on a ceramic substrate according to claim 7, wherein the tartaric acid or a salt thereof is Rochelle salt.

9. The method of forming a copper plated film on a ceramic substrate according to claim 1, wherein the nickel and copper salts are sulfates.

10. The method of forming a copper plated film on a ceramic substrate according to claim 9, wherein the tartaric acid or a salt thereof is Rochelle salt.

11. The method of forming a copper plated film on a ceramic substrate according to claim 4, wherein the plating is conducted in an aerated solution at an aeration rate is about 0.2 to 0.4 liters/minute.

12. The method of forming a copper plated film on a ceramic substrate according to claim 2, wherein the plating is conducted in an aerated solution at an aeration rate is about 0.1 to 0.5 liters/minute.

13. The method of forming a copper plated film on a ceramic substrate according to claim 1, wherein the plating is conducted in an aerated solution at an aeration rate is about 0.1 to 0.5 liters/minute.

14. The method of forming a copper plated film on a ceramic substrate according to claim 13, wherein the ceramic is etched prior to the electroless plating.

15. The method for forming a copper plated film on a ceramic substrate according to claim 1, wherein the heat treatment is effected in a nitrogen atmosphere.

16. The method for forming a copper plated film on a ceramic substrate according to claim 1, wherein the ceramic substrate is activated before plating.

17. The method for forming a copper plated film on a ceramic substrate according to claim 1, wherein the copper plating film formed has a thickness of at least about 2 $\mu$m.

* * * * *